United States Patent
Jaiswal et al.

(10) Patent No.: US 8,984,301 B2
(45) Date of Patent: Mar. 17, 2015

(54) EFFICIENT IDENTIFICATION OF ENTIRE ROW UNIQUENESS IN RELATIONAL DATABASES

(75) Inventors: Peeyush Jaiswal, Boca Raton, FL (US); Vikram S. Khatri, Durham, NC (US); Naveen Narayan, Flower Mound, TX (US); Burt L. Vialpando, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 1582 days.

(21) Appl. No.: 12/142,031

(22) Filed: Jun. 19, 2008

(65) Prior Publication Data
US 2009/0319541 A1 Dec. 24, 2009

(51) Int. Cl.
G06F 21/00 (2013.01)
G06F 17/30 (2006.01)

(52) U.S. Cl.
CPC ...... G06F 17/30595 (2013.01); G06F 17/3033 (2013.01)
USPC .......................................................... 713/193

(58) Field of Classification Search
CPC .................................................. G06F 17/3033
USPC .......................................................... 713/193
See application file for complete search history.

(56) References Cited

U.S. PATENT DOCUMENTS

| | | | |
|---|---|---|---|
| 5,201,046 A * | 4/1993 | Goldberg et al. | 1/1 |
| 5,511,190 A * | 4/1996 | Sharma et al. | 1/1 |
| 5,806,074 A * | 9/1998 | Souder et al. | 1/1 |
| 5,937,401 A * | 8/1999 | Hillegas | 1/1 |
| 6,804,667 B1 * | 10/2004 | Martin | 707/754 |
| 2001/0013035 A1 * | 8/2001 | Cohen | 707/5 |
| 2002/0080417 A1 * | 6/2002 | Quine | 358/407 |
| 2003/0014390 A1 * | 1/2003 | Finlay et al. | 707/1 |
| 2005/0138046 A1 * | 6/2005 | Miettinen et al. | 707/100 |
| 2006/0095791 A1 * | 5/2006 | Wong | 713/189 |
| 2007/0185838 A1 | 8/2007 | Peh et al. | |
| 2009/0319541 A1 * | 12/2009 | Jaiswal et al. | 707/100 |

FOREIGN PATENT DOCUMENTS

EP 1860603 11/2007

OTHER PUBLICATIONS

Bertino, Elisa, et al. "Privacy and ownership preserving of outsourced medical data." Data Engineering, 2005. ICDE 2005. Proceedings. 21st International Conference on. IEEE, 2005.*
An efficient hybrid join algorithm: a DB2 prototype, Data Engineering, 1991. Proceedings. Seventh International Conference, Cheng, J. ; IBM Santa Teresa Lab., San Jose, CA, USA ; Haderle, D. ; Hedges, R. ; Iyer, B.R. more authors.*

* cited by examiner

Primary Examiner — Harris Wang
(74) Attorney, Agent, or Firm — Yudell Isidore PLLC; John Pivnichny

(57) ABSTRACT

A method, system, and computer program product for efficiently comparing multiple columns of a row of a relational database to an incoming record. A computer creates a cryptographic sum for columns of a row of the relational database. The cryptographic sum is stored as a hidden column in the relational database. Logic may compare the cryptographic sum with an incoming cryptographic sum of entries in an incoming record. Logic may then determine if the incoming cryptographic sums differ from the corresponding cryptographic sums of rows of data of the relational database. When the two cryptographic sums are identical, the data of the incoming record is disregarded as an identical record that already exists. An entry of the incoming record may be added to the target table or updated within an existing record of the relational database when the cryptographic sum and the incoming cryptographic sum of that entry differ.

3 Claims, 3 Drawing Sheets

EFFICIENT IDENTIFICATION OF ENTIRE ROW UNIQUENESS IN RELATIONAL DATABASES

BACKGROUND OF THE INVENTION

1. Technical Field

The present invention relates in general to computer logic. Still more particularly, the present invention relates to calculating cryptographic sum of one or more records of a relational database and comparing the cryptographic sum against an incoming cryptographic sum of one or more rows of an incoming record to determine if rows of the incoming record are unique.

2. Description of the Related Art

There are times when it is necessary to identify the uniqueness of a composite of all values of an entire row in a relational database. Existing approaches of defining a primary or unique index key in a row of values simply describes the uniqueness of the columns in those index keys and does not tell anything about the other columns in that row. Creating a primary or unique key for the entire row may not be practical in many cases because the row may contain a substantial number of columns, or have varying data types. Currently there is no efficient manner to update only columns of an existing relational database that have changed when receiving a large source file with many rows that have not changed from the data in the relational database.

SUMMARY OF THE INVENTION

Disclosed is a method, system, and computer program product for efficiently comparing multiple columns of a row of a relational database to an incoming record. A computer creates a cryptographic sum for columns of a row of the relational database. The cryptographic sum is stored as a hidden column in the relational database. Logic of the computer may then compare the cryptographic sum with an incoming cryptographic sum of entries in an incoming record. The logic may then determine if the incoming cryptographic sums differ from the corresponding cryptographic sums of rows of data of the relational database. When the two cryptographic sums are identical, the data of the incoming record is disregarded as an identical record that already exists. An entry of the incoming record may be added to the target table or updated within an existing record of the relational database when the cryptographic sum and the incoming cryptographic sum of that entry differ.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

The illustrative embodiments provide a method, system, and computer program product for comparing columns of a row of a relational database with an incoming record and identifying columns of the row of the incoming record where values in the incoming record may have changed, in accordance with one embodiment of the invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
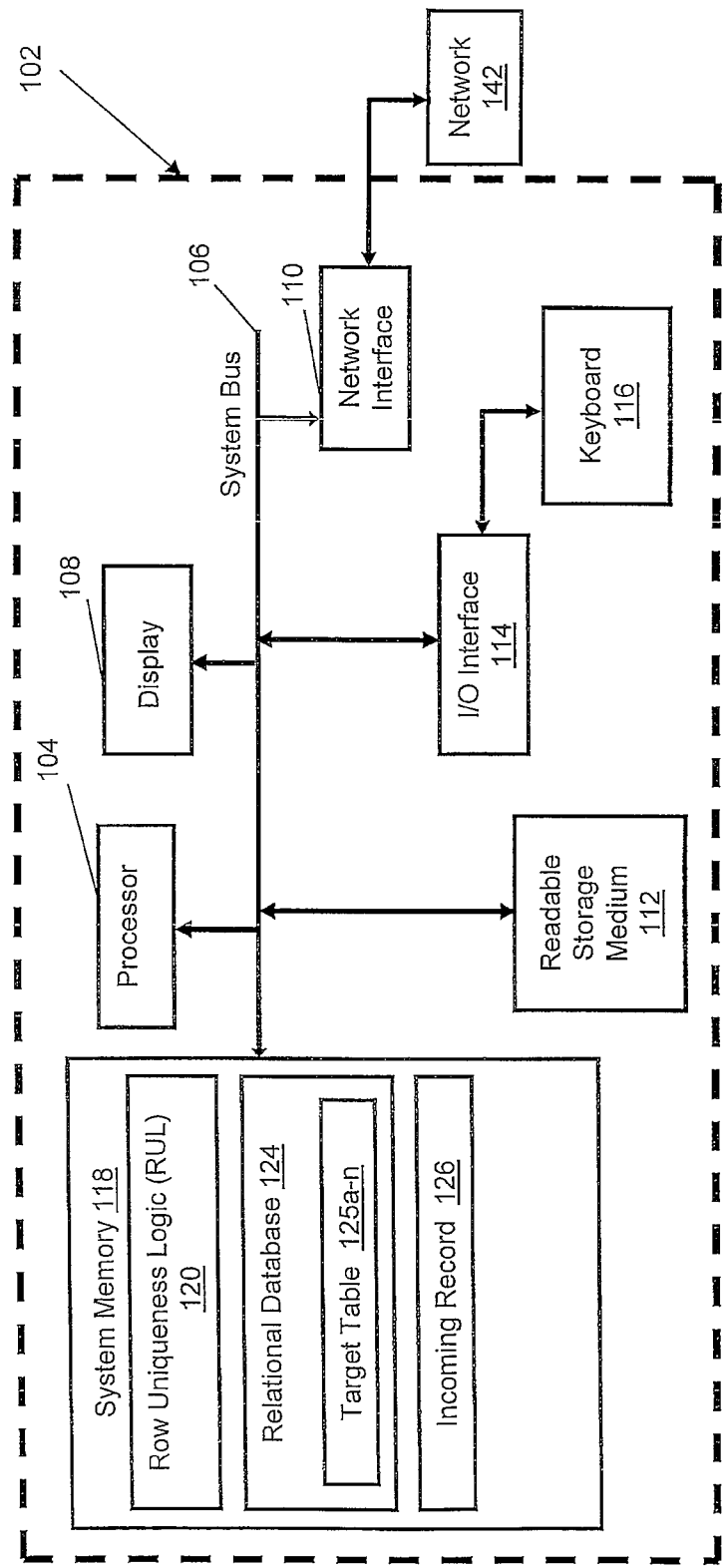
FIG. 1 is a block diagram of a computer in which the present invention may be implemented.

With reference now to FIG. 1, there is depicted a block diagram of a computer 102 in which the present invention may be implemented. Computer 102 includes a processor 104 that is coupled to a system bus 106. In an alternate embodiment, Processor 104 may be a database engine. A network interface 108, connected to system bus 106, enables computer 102 to connect to network 142 via wired or wireless mechanisms. Display 110, coupled to system bus 106, allows for presentation of a general user interface (including text and graphics) for use by a user of computer 102. System bus 106 also affords communication with a readable storage medium 112 (e.g., Compact Disk-Read Only Memory (CD-ROM), flash drive memory, etc). Input/Output (I/O) Interface 114, also connected to system bus 106, and permits user interaction with computer 102, such as data entry via keyboard 116.

Computer 102 also comprises system memory 118, which is connected to system bus 106. System memory 118 of computer 102 includes a relational database 124 that contains one or more target tables 125, each target table 125 containing entries of data archived in a tabular format. System memory 118 also includes an incoming record 126 is an incoming data record of one or more rows of data intended to be added or updated within the relational database 124 of computer 102. Incoming record 126 may be calculated by processor 104 or entered by a user of keyboard 116. Alternatively, incoming record 126 may be received by computer 102 from network 142 or a readable storage medium 112.

As shown, system memory 118 also comprises row uniqueness logic (RUL) 120 for maintaining and updating relational database 124. RUL 120 includes code for implementing the processes described in FIGS. 2-3. In one embodiment, computer 102 is able to utilize RUL 120 to compare columns of a row within relational database 124 with entries of an incoming record 126. RUL 120 then disregards rows of incoming record 126 that are identical to a row of target table 124, as described in greater detail below in FIGS. 2-3.

As illustrated and described herein, computer 102 may be a computer system or server having the required hardware components and programmed with RUL 120, executing on the processor to provide the functionality of the invention. However, computer 102 may also be a device that is specifically designed to include the functionality of RUL 120, as described herein. The hardware elements depicted in computer 102 are not intended to be exhaustive, but rather are representative to highlight essential components required by and/or utilized to implement the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
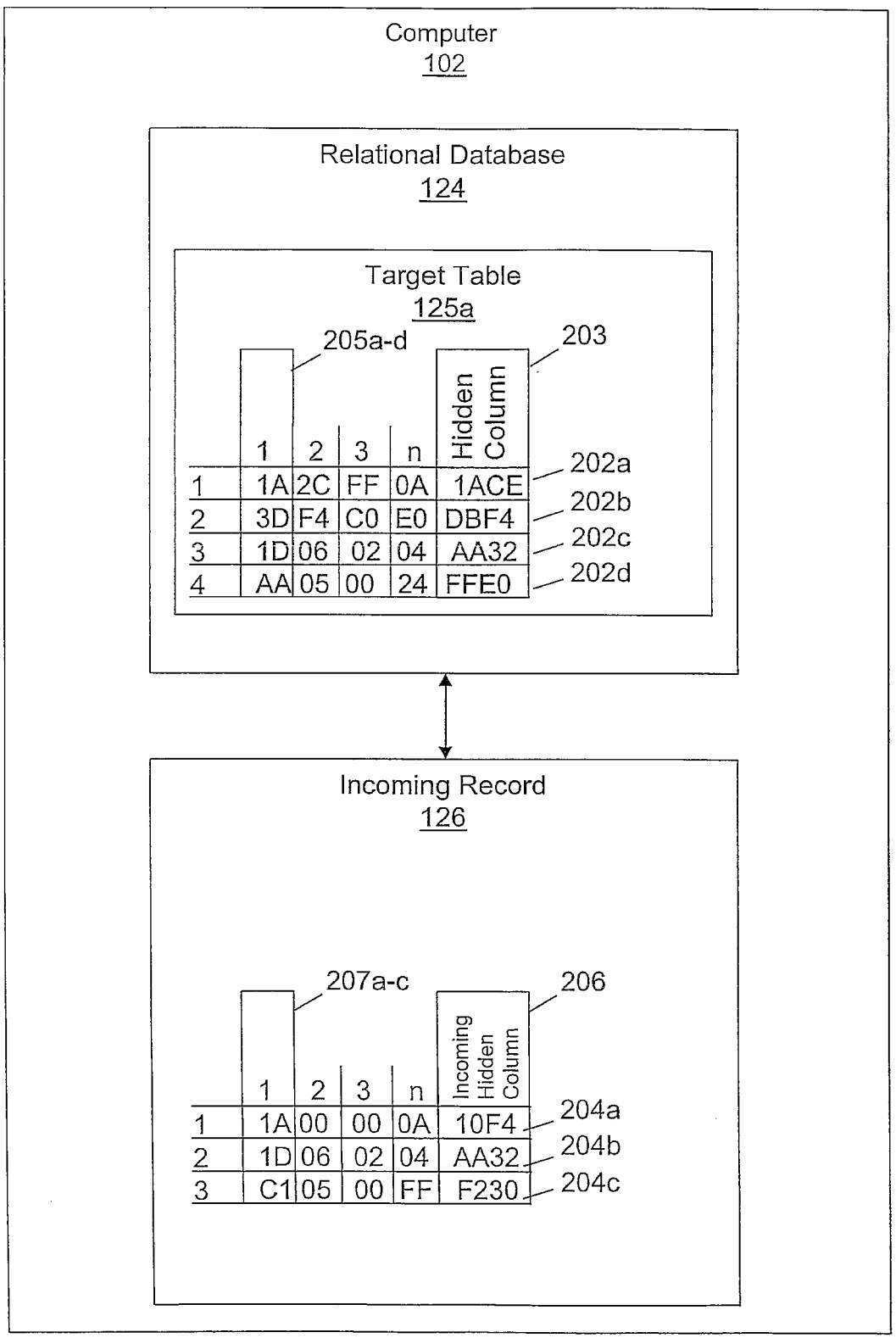
FIG. 2. is a block diagram of an exemplary system for determining uniqueness of rows of data of an incoming record by comparing incoming cryptographic sums of the incoming record with cryptographic sums of a relational database.

With reference now to FIG. 2, there is illustrated an exemplary system for determining uniqueness of rows of data of an incoming record by comparing incoming cryptographic sums of the incoming record with cryptographic sums of a relational database of the computer, in accordance with one embodiment of the invention. The illustrative embodiment is described from the perspective of the logic (e.g., RUL 120) comparing data of a target table (e.g., target table 125a-n) of a relational database (e.g., relational database 124, FIG. 1) with data of an incoming record (e.g., incoming record 126, FIG. 1). The relational database comprises one or more rows of data. Each row of data represents an entry. In an exemplary embodiment, relational database 124 may contain records of patient information at a hospital. Each row may represent a patient, while each column may contain relevant information of that patient (e.g., name, social security number (SSN), address, etc).

Logic of computer 102 (e.g., RUL 120) calculates a cryptographic sum 202a-n, where n is an integer equal to the number of rows in the target table. Each cryptographic sum 202a-n is calculated for a corresponding row of the target table. The cryptographic sum is a unique check sum signature of the data, created by reading data stored in the columns of a row of the target table and assigning a unique value based on the summing of data of the row. While the cryptographic sum 202a-n is unique to each row of the target table, because of the above calculation method, two rows of identical data would have identical cryptographic sums. Data of cryptographic sums 202a-n is separated into equal sized blocks and stored in a hidden column 203a-n of the target table. Cryptographic sums 202a-n may be generated from data in all columns of a row, or data of only selected columns of a row. In many instances a user of computer 102 may only wish for the logic to account for a comparison of a select number of columns of the target table with the data of an incoming record (e.g., compare only SSN and medical record stored in XML column).

An incoming record may be received by computer 102 by user input (e.g., keyboard 116, FIG. 1) or from a network connected to computer 102 (e.g., network 142, FIG. 1). The incoming record may contain one or more entries intended to be added to or updated to the existing records stored within the relational database. The incoming record may contain an incoming cryptographic sum 204a-n for each row of data of the incoming record. Incoming cryptographic sums 204a-n are stored in an incoming hidden column 206 of the incoming record. Alternatively, incoming cryptographic sum 204a-n may be calculated by logic (e.g., RUL 120, FIG. 1) or by hardware (e.g., processor 104, FIG. 1) of computer 102, and may subsequently be stored in an incoming hidden column 206 of the incoming record. Incoming cryptographic sums 204a-n may be generated from data in all columns of a row, or data of only selected columns of a row.

A row of the target table may also identify a record ID 205a-n for that row. Record ID 205a-n is an identification value (e.g., Name, Social Security Number, Row number) of the data contained in that row of the target table to identify the record. Similarly, an incoming record may contain an incoming record ID 207a-n for a row of the incoming record. Logic of computer 102 is able to determine row uniqueness by comparing cryptographic sums 202a-n of rows of the target table against incoming cryptographic sums 204a-n of an incoming record. When an incoming cryptographic sum 204a-n matches a cryptographic sum 202a-n of a similarly identified row of an existing record of the target table for a same record ID 205, the data of that row of the incoming record is disregarded, and is not updated of the target table. The similarly identified row is a row of a selection of rows of the target table 125.

Logic of computer 102 may determine when a row of the incoming record contains new information not currently stored in the target table. When a record ID 205a-n and a cryptographic sums 202a-n of a row of the target table do not match an incoming record ID 207a-n and an incoming cryptographic sum 204a-n of a row of an incoming record, the data is unique. Additionally, when a row of the incoming record does not contain an incoming record ID 207, the data is unique. This unique data may then be added to the target table by executing a logical instruction (e.g., INSERT, MERGE) of a processing engine (e.g. processor 104) of computer 102.

Logic of computer 102 may also determine when a row of the incoming record contains updated information of an existing record of the target table. This may be determined by the logic when a record ID 205a-n is identical to an incoming record ID 207a-n, but the cryptographic sum 202a-n and the incoming cryptographic sum 204a-n do not match. This unique data may then be updated within an existing record of the target table by executing a logical instruction (e.g., UPDATE) of computer 102.

For exemplary purposes, for rows 1-n of the relational database logic has calculated cryptographic sums 202a-d as 1ACE, DBF4, AA32, and FFE0, respectively. The record IDs 202a-n are contained in the first column of the database and are determined to be 1A. 3D, 1A, and AA, respectively. Computer 102 receives an incoming record from another terminal on the network. The incoming record contains three data entries with incoming cryptographic sums 204a-c of 10F4, AA32, and F230, respectively. The incoming record IDs 207a-c are determined to be 1A, 1D, and C1, respectively. Computer 102 compares incoming cryptographic sums 204a-c and incoming record IDs 207a-c of the three rows of the incoming record with cryptographic sums 202a-d and record IDs 205a-d, of the rows already stored in target table 125a. By performing this comparison, logic determines that row 1 of the incoming record contains updated information of row 1 of the target table 125a. Logic determined this by matching incoming record ID 207a with record ID 205a when the incoming cryptographic sum 204a does not match cryptographic sum 202a. Row 1 of target table 125a may be updated to include the contents of Row 1 of the incoming record. Logic determines that the data contained of row 2 of the incoming record is already accounted for in target table 125a. Logic identifies this by determining that both incoming record ID 207b and incoming cryptographic sum 204b matches record ID 205c and incoming cryptographic sum 202c stored in row 3 of target table 125a. The data stored in row 2 of the incoming record is then disregarded. Logic also determines that row 3 of the incoming record contains a new record not currently stored in the target table 125a. Logic did not find incoming record ID 207c to match record IDs 202a-d. The target table 125a may then be updated to include a new row containing the contents of Row 3 of the incoming record.

Figure 3:
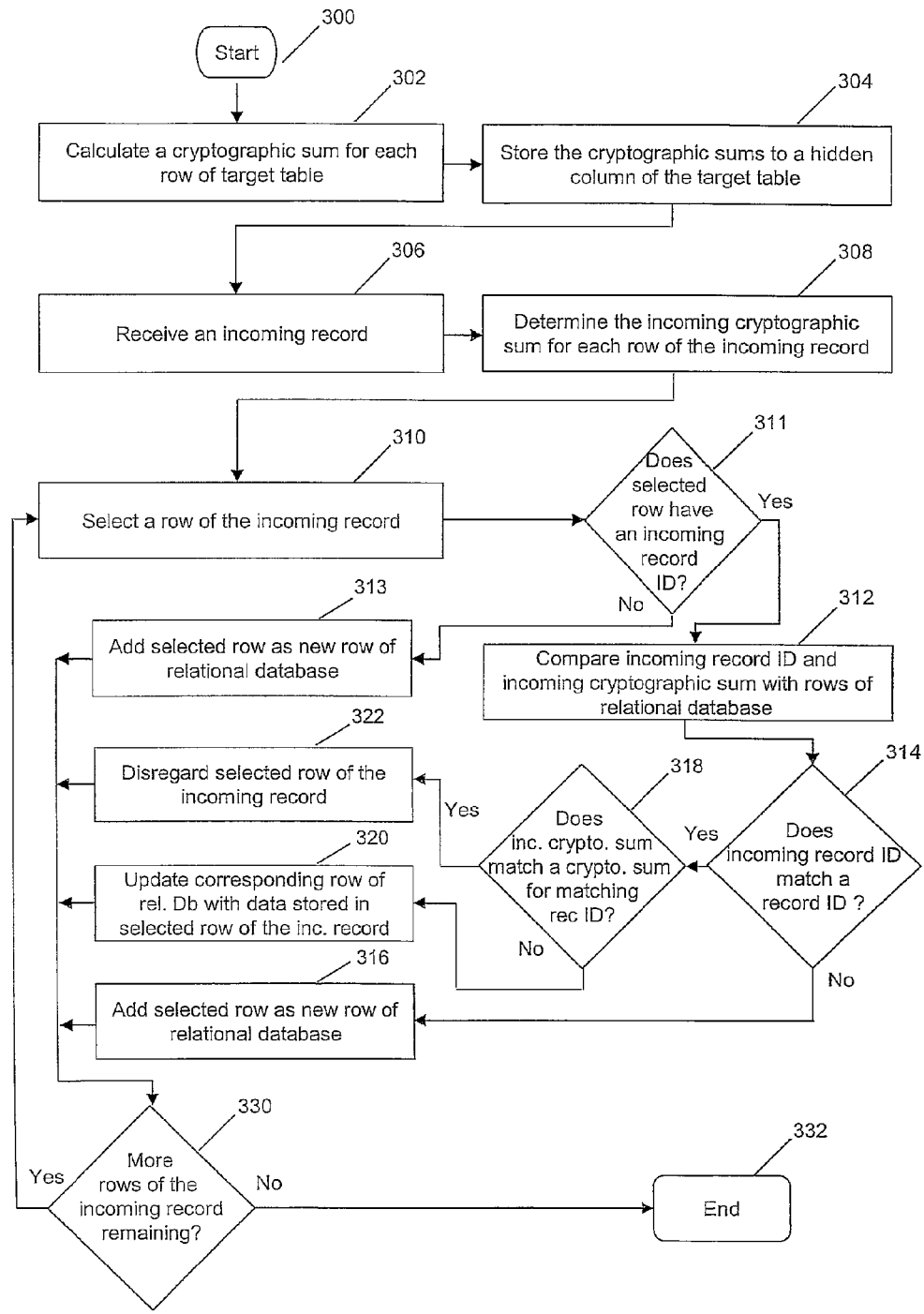
FIG. 3. is a high-level logical flowchart of an exemplary method for determining uniqueness of rows of data of an incoming record by comparing incoming cryptographic sums of the incoming record with cryptographic sums of a relational database.

With reference now to FIG. 3, a high-level logical flowchart of an exemplary method for determining uniqueness of rows of data of an incoming record by comparing incoming cryptographic sums of the incoming record with cryptographic sums of a target table of a relational database of the computer. After initiator block 300, the computer calculates a cryptographic sum for each row of a target table (block 302). The cryptographic sums for each row are then stored in a hidden column of each row of that target table (block 304). The computer then receives an incoming record (block 306). Once an incoming record is received, logic determines an incoming cryptographic sum for each row of the incoming record (block 308). The logic then selects a row of the incoming record (block 310). Logic may then determine if the selected row contains an incoming record ID (block 311). When the selected row does not have an incoming record ID, the selected row may be added as a new row of the relational database (block 313). Logic may then determine if the incoming record contains more rows (block 330). If additional rows remain, the process loops back to block 310 in an iterative manner. When no additional rows remain, the process ends at terminator block 332.

When the selected row contains an incoming record ID, logic may compare the incoming record ID and incoming cryptographic sum of selected row with the cryptographic sum and record ID of one or more rows of the target table (block 312). Logic then determines if the incoming record ID of the selected row matches a record ID of a row of the target table (block 314). When the incoming record ID of the selected row does not match a record ID of a row of the relational database the selected row may be added as a new row to the target table (block 316). Logic may then determine if the incoming record contains more rows (block 330). If additional rows remain, the process loops back to block 310 in an iterative manner. When no additional rows remain, the process ends at terminator block 332.

When the incoming record ID of the selected row does match a record ID of a row of the relational database the logic determines if the incoming cryptographic sum of the selected row matches the cryptographic sum for the same row of the relational database containing the matching record ID (block 318). When the incoming cryptographic sum of the selected row does not match a cryptographic sum of a row of the target table, logic may update the row of the target table where the incoming record ID matches the record ID with the information contained in the selected row of the incoming record (block 320). When the incoming cryptographic sum of the selected row does match a cryptographic sum of a row of the relational database, logic may disregard the selected row (block 322). Logic may then determine if the incoming record contains more rows (block 330). If additional rows remain, the process loops back to block 310 in an iterative manner. When no additional rows remain, the process ends at terminator block 332.

In the flow charts above, one or more of the methods are embodied in microcode such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. network attached storages, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for efficiently identifying uniqueness of rows of a relational database, the method comprising:
   a processor creating a cryptographic sum for each row of one or more rows of a target table of the relational database, wherein the cryptographic sum for a particular row of the one or more rows of the target table is calculated by summing the contents of a selected subset of columns from among all columns in that particular row of the target table and assigning a unique checksum value based on the summed contents of the selected subset of columns in that particular row;
   receiving an incoming record;
   selecting a next row of a plurality of rows of the incoming record;
   the processor determining if the next row contains an incoming cryptographic sum, wherein the incoming cryptographic sum of the next row is calculated by summing contents of a selected subset of columns from among all columns in the next row of the incoming record and assigning a unique checksum value based on the summed contents of the selected subset of columns in the next row, wherein the selected subset of columns comprises a first column containing a medical record and a second column containing a social security number;

in response to determining that the next row contains the incoming cryptographic sum:
comparing the incoming cryptographic sum of the next row to the cryptographic sum of each row of the one or more rows of the target table;
separating the cryptographic sum into a plurality of equally sized blocks; and
the processor appending the plurality of equally sized blocks of the cryptographic sum of the one or more rows of the target table to a hidden column of the target table in response to determining the incoming cryptographic sum of the next row is identical to at least one cryptographic sum of the one or more rows of the target table, the processor disregarding the next row when updating the target table;

in response to determining the incoming cryptographic sum of the next row is not identical to at least one cryptographic sum of the one or more rows of the target table, determining if the next row contains an incoming record ID, wherein the incoming record ID is an identification value of the next row;

in response to determining that the next row contains the incoming record ID, identifying the incoming record ID for the next row;

comparing the incoming record ID of the next row with a record ID of the one or more rows of the target table; and in response to determining the incoming record ID is identical to at least one record ID of at least one row the one or more rows of the target table, the processor updating contents of the at least one row with contents of the next row;

in response to determining the incoming record ID is not identical to at least one record ID of at least one row the one or more rows of the target table, and the incoming cryptographic sum of the next row is not identical to at least one cryptographic sum of the one or more rows of the target table, the processor adding the next row as a new row within the target table via a logical instruction; and in response to determining the next row does not contain the incoming record ID, the processor adding the next row as a new row within the target table via a logical instruction; and in response to determining that the next row does not contain the incoming cryptographic sum, the processor:
calculating the incoming cryptographic sum for the next row;
separating the incoming cryptographic sum into a plurality of equally sized blocks; and
storing the plurality of equally sized blocks of the incoming cryptographic sum for the next row in a hidden column of the next row; and iteratively performing, until no additional rows remain in the plurality of rows of the incoming record, the functions of: determining if the next row contains an incoming cryptographic sum, comparing the incoming cryptographic sum of the next row to the cryptographic sum of each row of the one or more rows of the target table, and in response to determining the incoming cryptographic sum of the next row is identical to at least one cryptographic sum of the one or more rows of the target table, disregarding the next row when updating the target table.

2. A computer comprising:
a processor;
a memory coupled to the processor;
processing logic executing on the processor that:
creates a cryptographic sum for each row of one or more rows of a target table of the relational database, wherein the cryptographic sum for a particular row of the one or more rows of the target table is calculated by summing the contents of a selected subset of columns from among all columns in that particular row of the target table and assigning a unique checksum value based on the summed contents of the selected subset of columns in that particular row;
receives an incoming record;
selects a next row of a plurality of rows of the incoming record;
determines if the next row contains an incoming cryptographic sum, wherein the incoming cryptographic sum of the next row is calculated by summing contents of a selected subset of columns from among all columns in the next row of the incoming record and assigning a unique checksum value based on the summed contents of the selected subset of columns in the next row;
in response to determining that the next row contains the incoming cryptographic sum:
compares the incoming cryptographic sum of the next row to the cryptographic sum of each row of the one or more rows of the target table;
separates the cryptographic sum into a plurality of equally sized blocks; and
appends the plurality of equally sized blocks of the cryptographic sum of the one or more rows of the target table to a hidden column of the target table;
in response to determining the incoming cryptographic sum of the next row is identical to at least one cryptographic sum of the one or more rows of the target table, disregards the next row when updating the target table;
in response to determining the incoming cryptographic sum of the next row is not identical to at least one cryptographic sum of the one or more rows of the target table, determines if the next row contains an incoming record ID, wherein the incoming record ID is an identification value of the next row;
in response to determining that the next row contains the incoming record ID, identifies the incoming record ID for the next row;
compares the incoming record ID of the next row a record ID of the one or more rows of the target table;
in response to determining the incoming record ID is identical to at least one record ID of at least one row the one or more rows of the target table, updates contents of the-at least one row with contents of the next row;
in response to determining the incoming record ID is not identical to at least one record ID of at least one row the one or more rows of the target table, and the incoming cryptographic sum of the next row is not identical to at least one cryptographic sum of the one or more rows of the target table, adds the next row as a new row of the target table via a logical instruction;
in response to determining the next row does not contain the incoming record ID, adds the next row as a new row within the target table via a logical instruction;
in response to determining that the next row does not contain the incoming cryptographic sum:

calculates the incoming cryptographic sum for the next row;
separates the incoming cryptographic sum into a plurality of equally sized blocks; and
stores the plurality of equally sized blocks of the incoming cryptographic sum for the next row in a hidden column of the next row; and
iteratively performs, until no additional rows remain in the plurality of rows of the incoming record, the functions of determines if the next row contains an incoming cryptographic sum, compares the incoming cryptographic sum of the next row to the cryptographic sum of each row of the one or more rows of the target table, and in response to determining the incoming cryptographic sum of the next row is identical to the cryptographic sum of the similarly identified row, disregards the next row when updating the target table;
wherein the selected subset of columns comprises a first column containing a medical record and a second column containing a social security number.

3. A storage device having a plurality of instructions embodied therein, wherein the plurality of instructions, when executed by a processing device, allows a machine to:
create a cryptographic sum for each row of one or more rows of a target table of the relational database, wherein the cryptographic sum for a particular row of the one or more rows of the target table is calculated by summing the contents of a selected subset of columns from among all columns in that particular row of the target table and assigning a unique checksum value based on the summed contents of the selected subset of columns in that particular row;
receive an incoming record;
select a next row of a plurality of rows of the incoming record;
determine if the next row contains an incoming cryptographic sum, wherein the incoming cryptographic sum of the next row is calculated by summing contents of a selected subset of columns from among all columns in the next row of the incoming record and assigning a unique checksum value based on the summed contents of the selected subset of columns in the next row;
in response to determining that the next row contains the incoming cryptographic sum:
compare the incoming cryptographic sum of the next row to the cryptographic sum of each row of the one or more rows of the target table;
separate the cryptographic sum into a plurality of equally sized blocks; and
append the plurality of equally sized blocks of the cryptographic sum of the one or more rows of the target table to a hidden column of the target table;
in response to determining the incoming cryptographic sum of the next row is identical to at least one cryptographic sum of the one or more rows of the target table, disregard the next row when updating the target table;
in response to determining the incoming cryptographic sum of the next row is not identical to at least one cryptographic sum of the one or more rows of the target table, determine if the next row contains an incoming record ID, wherein the incoming record ID is an identification value of the next row;
in response to determining that the next row contains the incoming record ID, identify the incoming record ID for the next row;
compare the incoming record ID of the next row with a record ID of the one or more rows of the target table;
in response to determining the incoming record ID is identical to at least one record ID of at least one row the one or more rows of the target table, update contents of the at least one row with contents of the next row;
in response to determining the incoming record ID is not identical to at least one record ID of at least one row the one or more rows of the target table, and the incoming cryptographic sum of the next row is not identical to at least one cryptographic sum of the one or more rows of the target table, add the next row as a new row within the target table via a logical instruction; and
in response to determining the next row does not contain the incoming record ID, add the next row as a new row within the target table via a logical instruction;
in response to determining that the next row does not contain the incoming cryptographic sum:
calculate the incoming cryptographic sum for the next row;
separate the incoming cryptographic sum into a plurality of equally sized blocks; and
store the plurality of equally sized blocks of the incoming cryptographic sum for the next row in a hidden column of the next row; and
iteratively perform, until no additional rows remain in the plurality of rows of the incoming record, the functions of determine if the next row contains an incoming cryptographic sum, compare the incoming cryptographic sum of the next row to the cryptographic sum of each row of the one or more rows of the target table, and in response to determining the incoming cryptographic sum of the next row is identical to the cryptographic sum of the similarly identified row, disregard the next row when updating the target table;
wherein the selected subset of columns comprises a first column containing a medical record and a second column containing a social security number.

* * * * *